Figure 1:
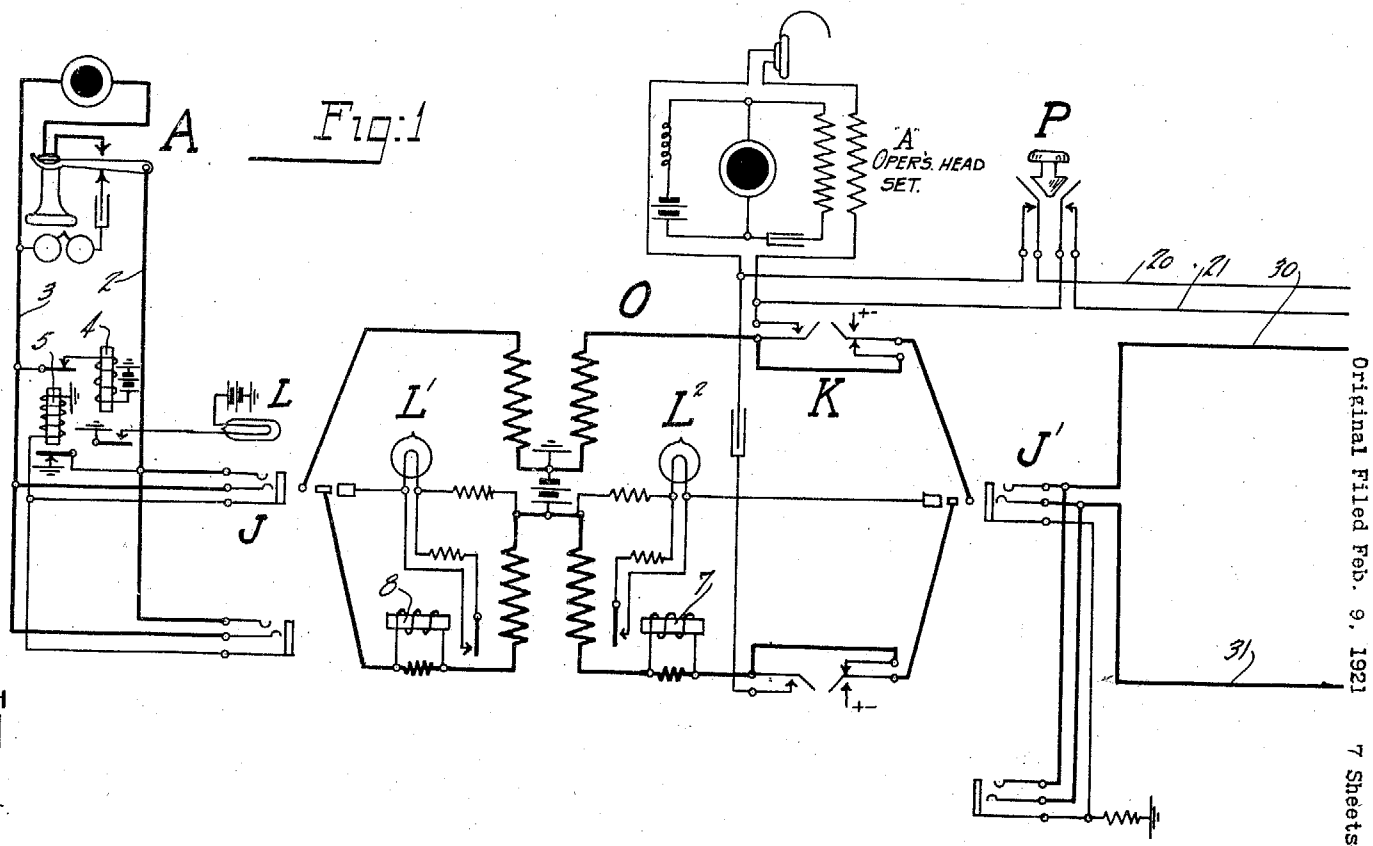

April 1, 1930.

M. L. NELSON

MULTIOFFICE TELEPHONE SYSTEM

Re. 17,632

Original Filed Feb. 9, 1921 7 Sheets-Sheet 1

Inventor
Marin L. Nelson
Chas. M. Candy. Atty.

April 1, 1930.

M. L. NELSON

MULTIOFFICE TELEPHONE SYSTEM

Re. 17,632

Original Filed Feb. 9, 1921 7 Sheets-Sheet 2

Inventor
Martin L. Nelson
Chas. W. Candy Atty.

April 1, 1930.

M. L. NELSON

MULTIOFFICE TELEPHONE SYSTEM

Re. 17,632

Original Filed Feb. 9, 1921 7 Sheets-Sheet 3

—Inventor—
Marin L. Nelson
Chas. Ter. Candy Atty.

April 1, 1930.

M. L. NELSON

MULTIOFFICE TELEPHONE SYSTEM

Re. 17,632

Original Filed Feb. 9, 1921 7 Sheets-Sheet 4

Inventor
Marlin L. Nelson
Chas. Tu Candy Atty.

April 1, 1930.

M. L. NELSON

MULTIOFFICE TELEPHONE SYSTEM

Re. 17,632

Original Filed Feb. 9, 1921

7 Sheets-Sheet 5

Inventor

Marlin L. Nelson

Chas. Th. Candy: Atty.

April 1, 1930.

M. L. NELSON

MULTIOFFICE TELEPHONE SYSTEM

Re. 17,632

Original Filed Feb. 9, 1921 7 Sheets-Sheet 6

Inventor
Martin L. Nelson
Chas. W. Candy Atty

April 1, 1930. M. L. NELSON Re. 17,632

MULTIOFFICE TELEPHONE SYSTEM

Original Filed Feb. 9, 1921 7 Sheets-Sheet 7

Inventor
Martin L. Nelson
Chas. Sw. Candy Atty.

Reissued Apr. 1, 1930 Re. 17,632

UNITED STATES PATENT OFFICE

MARTIN L. NELSON, OF PARK RIDGE, ILLINOIS, ASSIGNOR, BY MESNE ASSIGNMENTS, TO AUTOMATIC ELECTRIC INC., OF CHICAGO, ILLINOIS, A CORPORATION OF DELAWARE

MULTIOFFICE TELEPHONE SYSTEM

Original application filed February 9, 1921, Serial No. 443,688. Renewed March 29, 1926. Original No. 1,614,678, dated January 18, 1927. Application for reissue filed January 11, 1930. Serial No. 420,262.

The present invention relates to multi-office telephone systems, more especially to such systems as comprise both manual and automatic offices, or exchanges; and the object of the invention, broadly stated, is the provision of new and improved arrangements for handling those calls which originate at a manual office and which are completed in an automatic office.

Various schemes have been proposed before for handling the class of connections referred to and a number of them have been used with some degree of satisfaction by operating telephone companies. The fact is, however, that so far as applicant is aware all of the systems heretofore used, or suggested, are either excessively complicated or else they do not perform the desired functions with that degree of efficiency or simplicity which is desirable. The present circuits have been designed, therefore, with the shortcomings of prior systems in mind, and with a view to producing an improved system having the maximum simplicity, and capable of doing the required work at high speed and under uniform operating conditions.

An essential feature of the invention is the B operator's sending equipment at the automatic exchange. This apparatus includes a novel sending switch, and a plurality of relay storage devices of new design, together with circuits whereby the digits, corresponding to successively actuated digit keys, are registered on the storage devices, whereby the storage devices successively control the sending switch according to the registered digits, and whereby the entire apparatus is automatically disassociated from the trunk line in use when the connection is completed. There are other features not now specifically mentioned, all of which will be pointed out and fully explained hereinafter with reference to the accompanying drawings.

For an understanding of the circuits, Figs. 1, 2, 3, and 4 of the drawings should be laid out in order with corresponding lines at the ends thereof in alignment, while Figs. 5, 6, and 7 should be similarly laid out immediately below Figs. 2, 3, and 4, respectively. The drawings when thus arranged show an inter-office trunk line connecting a manual exchange with an automatic exchange, and the associated equipment required to establish a connection between two subscribers' lines such, for example, as the line of the manual sub station A, Fig. 1, and the line of the automatic sub station A′, Fig. 4. The connection, when established, involves a manual cord circuit such as the cord circuit O, Fig. 1; an inter-office trunk line, manual to automatic, and associated trunk equipment, shown in Fig. 2; a first selector switch D, Fig. 3; a second selector switch such as the second selector E; and a final connector switch such as the connector H, Fig. 4. The apparatus shown in Figs. 5, 6, and 7 constitutes a B operator's sender which is used to control the setting of the automatic switches, and which may be temporarily associated with the trunk line for this purpose. Fig. 8 shows a lamp indicating device associated with the sender shown in Figs. 5, 6, and 7.

The equipment shown in Fig. 1 comprising the telephone station A and the associated line equipment at the exchange, the operator's cord circuit O, and the A operator's head set, is all manual equipment of well known type and on this account will not have to be described.

Figure 2:
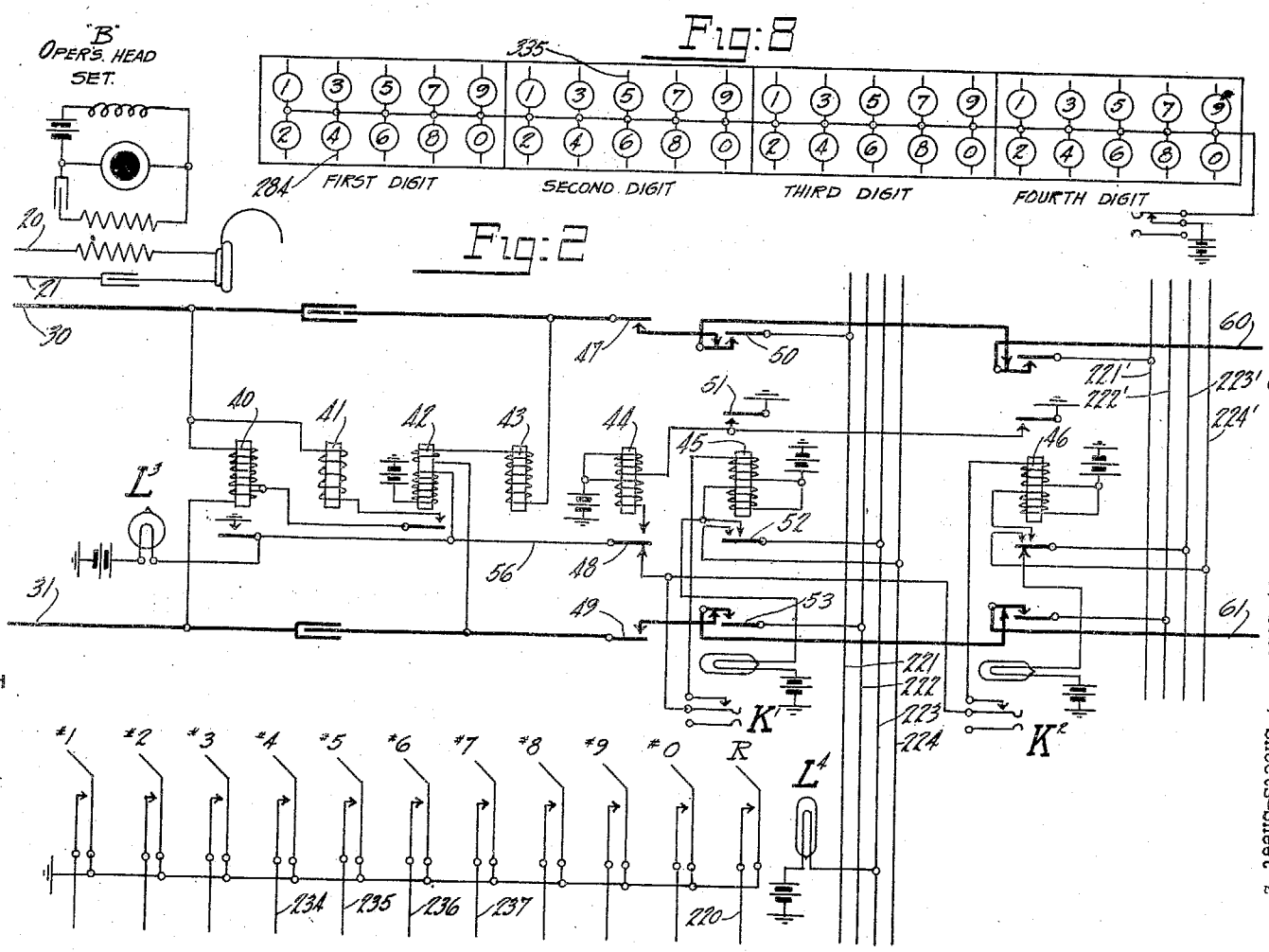
Figure 3:
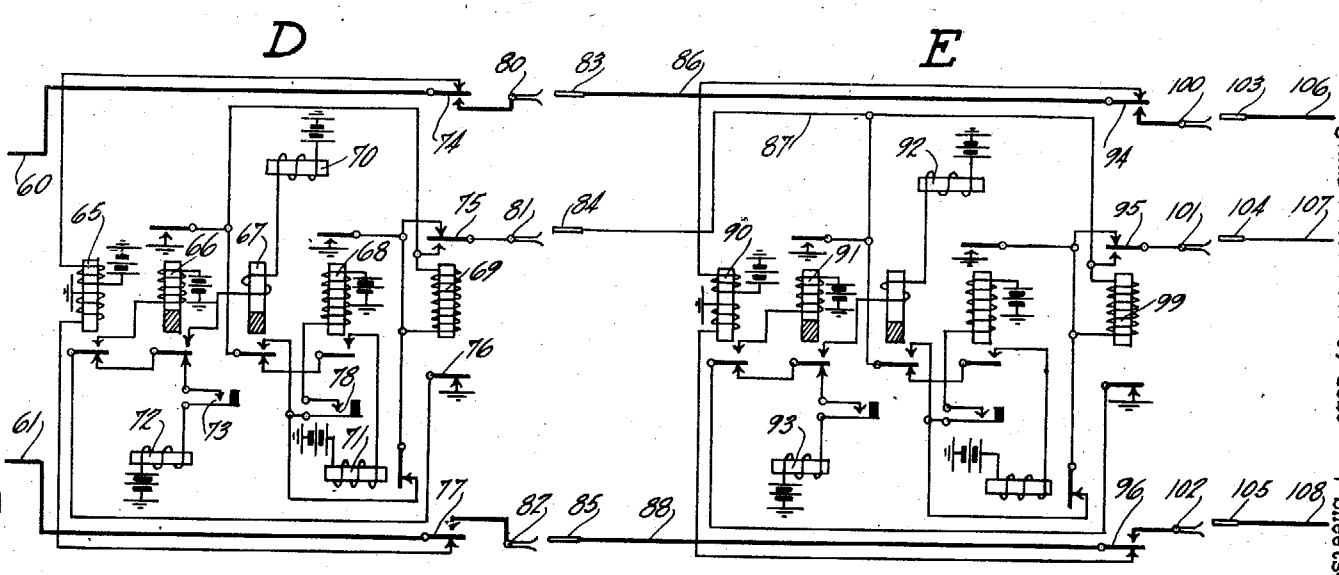
Figure 4:
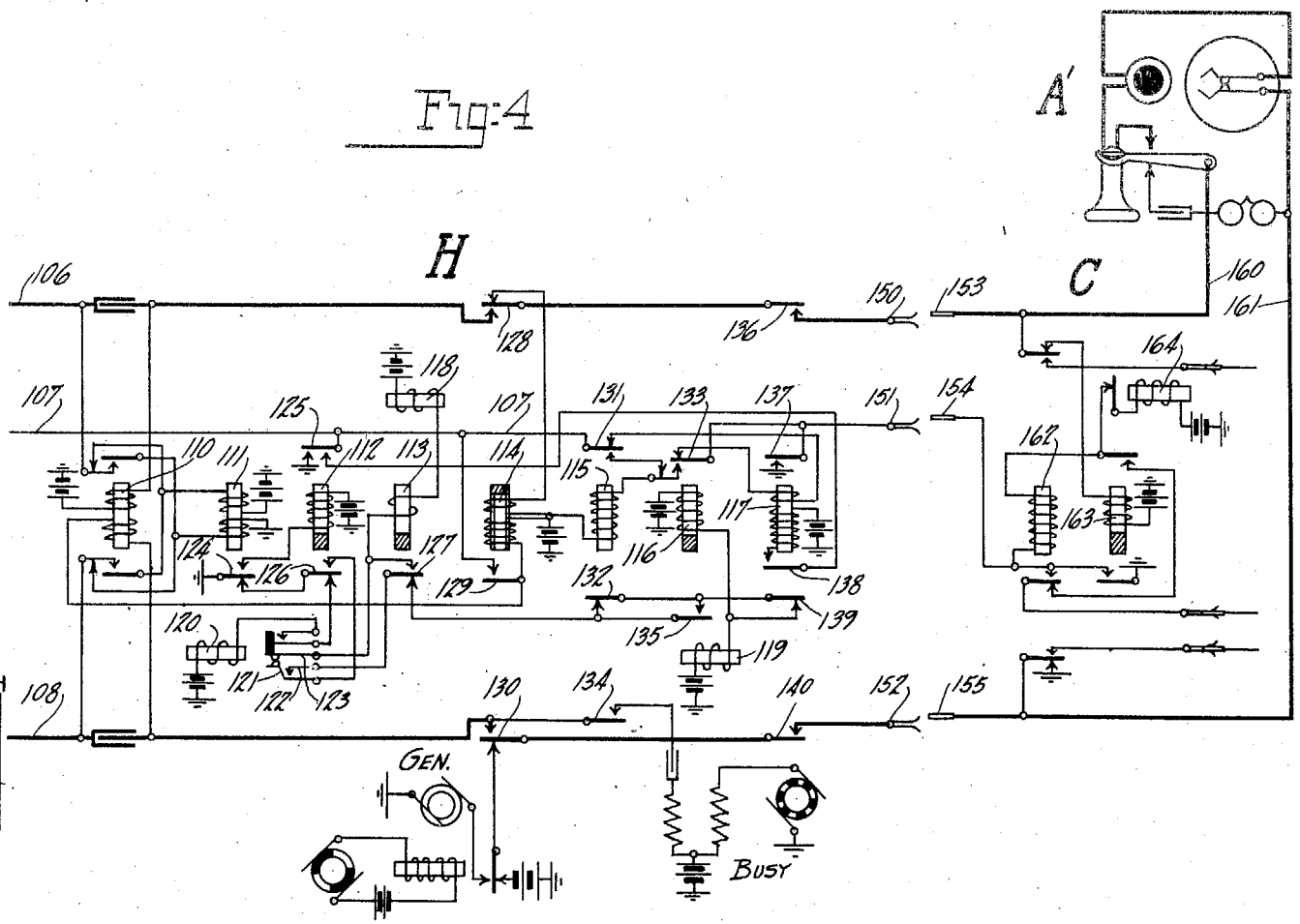

The inter-office trunk line, comprising conductors 30 and 31, is one of a large group of similar trunk lines and extends from the jack J′ in the outgoing trunk multiple at the A board, in the manual exchange, by way of the B operator's position, shown in Fig. 2, to the first selector D, which is shown in Fig. 3. At the B operator's position the trunk line is normally open and is provided with a group of relays, whose circuits are shown in full, and whose operation will also be described in the course of the general explanation. According to the usual practice there is a call circuit, or order wire circuit, which terminates in the B operator's head set at the automatic exchange, and which is multipled in the call circuit keys at the A board in the manual exchange.

The first and second selectors D and E are automatic switches of the well known Strowger vertical and rotary type, such as are in common use in numerous automatic telephone exchanges throughout the country. The connector H is likewise a Strowger vertical and rotary switch and is similar in mechanical construction to the selector switches D and E. The circuits are arranged, however, for a directive control in both the vertical and rotary movements. All of these switches are operated according to the well known two wire system of control. The connector switch H has access to 100 subscribers' lines, one of which is the line extending to automatic sub station A′. The reference character C indicates a rotary line switch of well known type which is individual to the line of substation A′, and which is used by the subscriber thereat for making outgoing calls.

Figure 5:
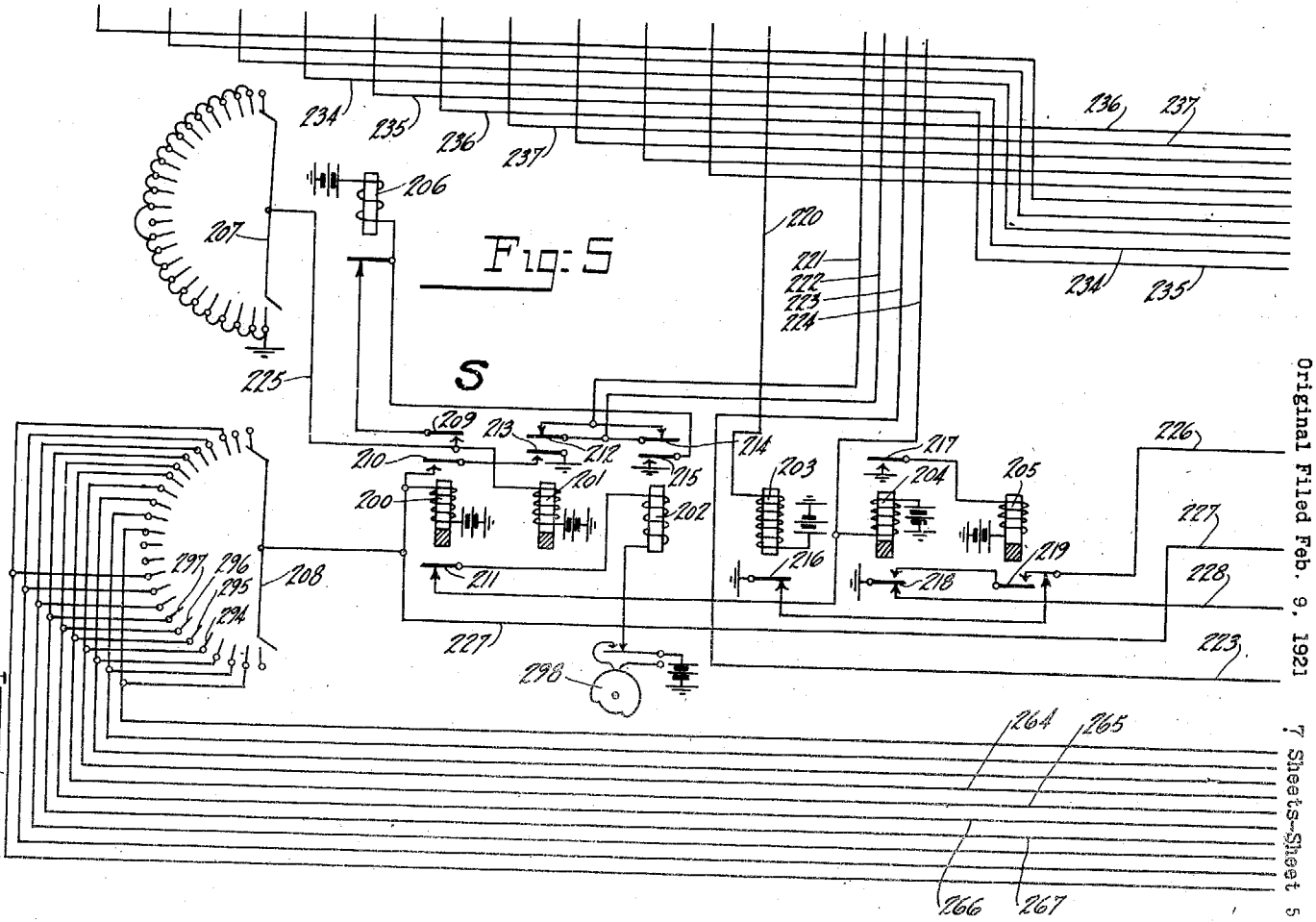
Figure 6:
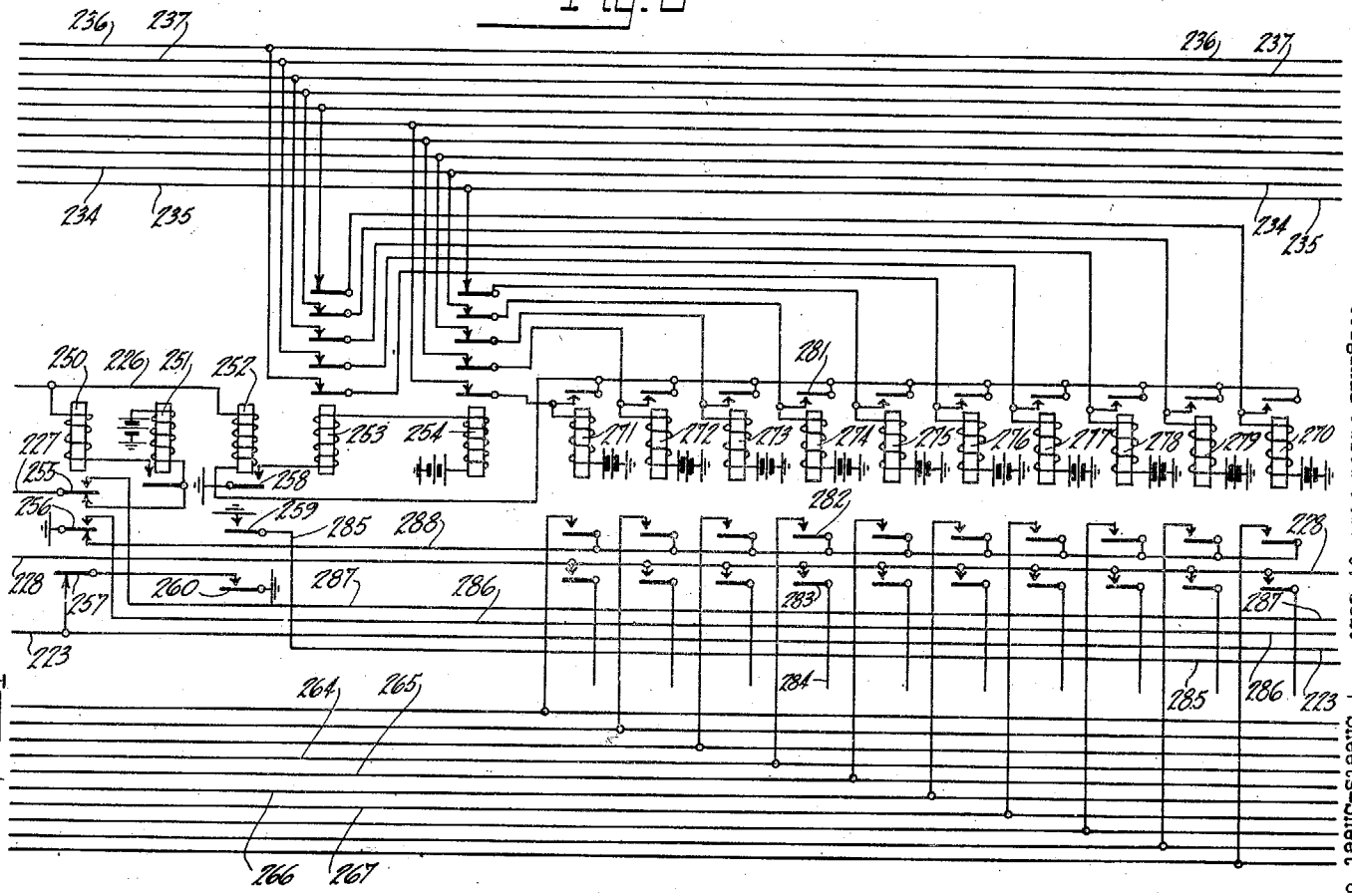
Figure 7:
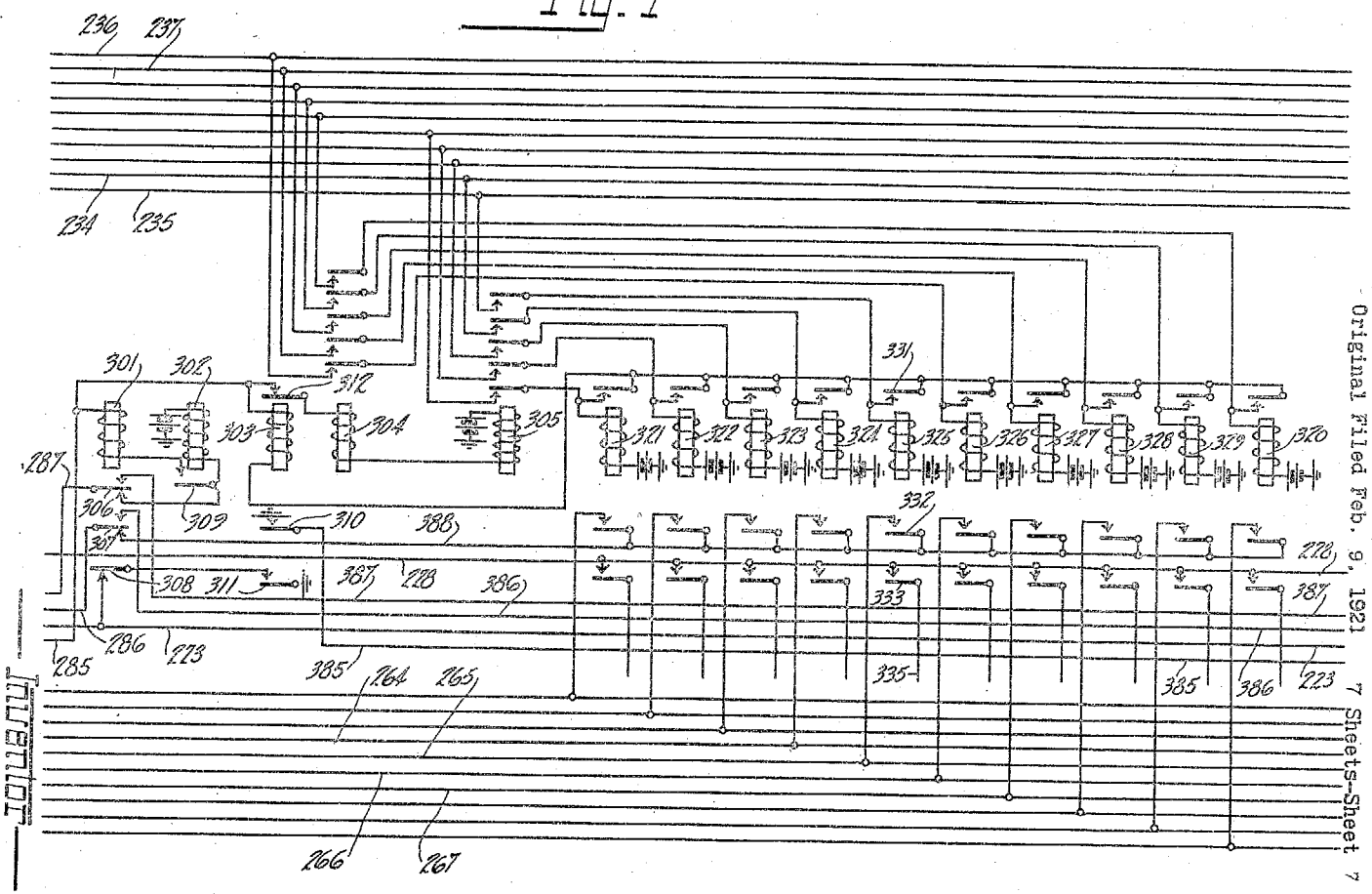

The B operator's sender shown herein comprises a set of digit keys, shown in the lower left-hand corner of Fig. 2, a sending switch indicated by the reference character S, and including a plurality of associated relays, all of which are shown in Fig. 5, a first digit storage device, shown in Fig. 6, a second digit storage device, shown in Fig. 7, and third and fourth digit storage devices, which are not shown but are in all respects exactly like the second digit storage device which is shown in Fig. 7. There is also a lamp indicating device, shown in Fig. 8 on the same sheet with Fig. 2.

The digit keys Nos. 1 to 0, inclusive, are ordinary self restoring keys, or push buttons, located in a single row in front of the B operator, and control the setting of the storage devices. There is also a release key R and a lamp $L^4$ located in the same row with the digit keys. The sending switch S, in Fig. 5, is a simple rotary switch having two horizontal rows of bank contacts and the two wipers 207 and 208 associated therewith. These wipers are adapted to be driven by any suitable form of ratchet mechanism in a forward direction only by means of the stepping magnet 206. The cam 298 is mounted on a constantly rotating shaft which is driven by a small motor, or other suitable means, at a speed of about ten revolutions per second. This is the impulse sending cam and may be common to a number of different senders.

The first digit storage device, shown in Fig. 6, comprises the digit relays 271–270, inclusive, and the five relays 250–254, inclusive. The other storage devices are very similar to the first digit storage device, and all of them will be described in full hereinafter.

A little further description of the apparatus at the B operator's position may now be advisable before proceeding with the operation of the system. In addition to the inter-office trunk line, shown in Fig. 2, there may be perhaps fifty or more other trunk lines, all extending through the position by way of their respective associated relay equipments to first selector switches. In addition to the operator's sender which is shown in the drawings, there are two or three other senders, making perhaps four altogether, and each sender terminates in a four conductor trunk line which is multipled at the relay equipments of all the inter-office trunk lines. Thus, any sender may be connected with any inter-office trunk line. The local trunk line associated with the sender shown in the drawings, comprises conductors 221–224, inclusive, which conductors are connected in multiple to contacts of relays, such as the relay 45, associated with the several inter-office trunk lines. Although none of the other senders are shown, the local trunk line associated with the second sender is shown in the drawing at the right of Fig. 2, and comprises conductors 221′ to 224′, inclusive. The local trunk lines associated with the other two senders are similar to the one shown and, therefore, it is believed that the arrangements will be readily understood without further explanation.

The lamp indicating device, shown in Fig. 8, is individual to the sender illustrated, and there is a similar indicating device for each of the other senders. This indicating device comprises a plurality of banks of switch-board lamps, there being a lamp in each bank for each of the ten digits. The number of different banks of lamps will, of course, depend upon the number of digits in the telephone numbers; for four digit numbers four banks of lamps will, of course, be required as illustrated in the drawing. The digits to which the lamps correspond are printed on a semi-transparent screen behind which the lamps are located, and these numbers are ordinarily scarcely discernible. When the lamps immediately behind any series of digits are lighted, however, these digits will stand out clearly and may be read by the operator with great facility. The manner in which the lamps are connected is exceedingly simple, and on this account the wiring has not been drawn out in detail. It may be explained, however, that one side of all of the lamps is connected to the exchange battery while individual conductors run from the other side of each lamp to contact springs on the digit relays of the several storage devices. Thus, the individual conductors, such as conductor 284, which come from the ten lamps in the first digit bank are connected to springs of relays 271–270, inclusive; the conductors, such as conductor 335, coming from the lamps of the second digit bank are connected to contacts of relays 321–320, inclusive, of the second digit storage device, while the conductors coming from the lamps in the third and fourth digit banks are similarly connected to the contacts of the digit relays in the third and fourth storage devices, respectively.

The operation of the system in establishing a telephone connection will now be explained, it being assumed for this purpose that the subscriber at sub station A in the manual exchange desires to obtain connection with the subscriber at sub station A′ in the automatic exchange. The telephone number at sub station A′ will be assumed as No. 4567. When the receiver is removed at sub station A, a circuit is completed over the line conductors 2 and 3 for the line relay 4, which is accordingly energized and lights the line lamp L. This notifies the A operator, at whose position the answering jack J appears, that a call has been received and she will respond by inserting the answering plug of an idle cord circuit, the cord circuit O for example, in the jack J. Upon the insertion of the plug, a circuit is completed over the sleeve conductor thereof which includes the cut off relay 5 of the calling line, and the supervisory lamp L′ in the cord circuit in series. The cut off relay 5 is accordingly energized and disconnects the line relay 4. The supervisory lamp L′ would be lighted at the same time were it not for the fact that the receiver is off at sub station A, whose transmitter is now supplied with current from the cord circuit. As a result, the supervisory relay 8 in the ring side of the cord circuit is energized and shunts out the lamp L′ to prevent it from being lighted.

The A operator will now throw her key K to listening position in order to obtain from the calling subscriber the number of the party with whom he desires to converse. Having ascertained that the desired number is the No. 4567 in the automatic office, the operator will restore her listening key and will depress the proper call circuit button in order to connect her head set with the call circuit extending to the desired office, or exchange. The call circuit button at this particular A operator's position, which is associated with the particular automatic exchange in question, is the button P, and when this is depressed the A operator's head set is connected directly with the B operator's head set in the automatic office. The A operator now repeats the No. 4567 to the B operator, and this number is registered by the latter operator by means of the digit keys associated with one of her senders as soon as it is received, it being understood, of course, that in the present case the sender which is shown in the drawing is the one which will be used. In registering the number, the B operator will depress the digit keys 4, 5, 6, and 7 in rapid succession and the entire number is completely registered practically as soon as the A operator has finished transmitting it. As soon as the A operator is through talking the B operator will reply with the number of an idle interoffice trunk line. The A operator now inserts the calling plug of the cord circuit in use in the designated jack in the outgoing trunk multiple. Assuming that the trunk line comprising conductors 30 and 31 is the trunk line assigned, the plug will be inserted in the jack J′ and a circuit is immediately completed over the two sides of the trunk line in series for the bridged relay 40 at the B operator's position. Relay 40 is energized by current flowing from the cord circuit at the A board and closes a circuit for the busy lamp $L^3$. This notifies the B operator that the A operator has taken the trunk and she will now depress the key K′ which is associated with the trunk line in use and also with the sender upon which the desired number has been registered in order to connect this sender with the trunk line. The sending switch S, Fig. 5, is now operated under the control of the several storage devices in succession and four series of impulses are transmitted over the trunk line comprising conductors 60 and 61, connnecting Figs. 2 and 3, whereby the first selector D, a second selector, such as the selector E, and a connector, such as the connector H, are operated in order to complete connection to the desired subscriber's line.

The B operator, having actuated the trunk key K′, has done all that is required of her toward the establishment of the connection and need pay no further attention to it. The sender, upon which the number has been registered, controls the automatic switches without any further attention, and when the last switch has been operated the sender is automatically disassociated from the trunk line and is ready for use in registering another called number.

We will return now to the point where the B operator begins to register the number transmitted to her by the A operator in order to go into the subsequent circuit operations more in detail. The ten digit relays of the first digit storage device are normally connected to the ten leads, or conductors, coming from the ten digit keys, and when the operator depresses the No. 4 digit key a circuit is completed over conductor 234 for the fourth digit relay 274. Upon energizing, relay 274 prepares a locking circuit for itself at armature 281; connects the grounded conductor 228 to conductor 284 which extends to the No. 4 lamp in the first digit bank of the lamp indicating device, and causes the digit 4 to be immediately displayed; and connects the grounded conductor 288 with the conductor 264 which extends to the lower bank of the impulse sending switch S and there terminates in bank contact 294. The operator depresses the digit key only for an instant and when it is released, relay 274 is held up over the hereinbefore mentioned locking circuit which includes relay 252 and the grounded conductor 226. Relay 252 is accordingly energized in series with relay 274, having been prevented from energizing before by the short-circuiting ground on conductor 234 and at its armature 258 closes a circuit for relays 253 and 254 in series, which, upon energizing, disconnect all of the digit relays, 271–270, inclusive, from the conductors coming from the digit keys. Relay 274, of course, remains energized over its locking circuit. Relay 252 also connects ground to the holding conductor 223 at armature 260, and at armature 259 connects ground to conductor 285 extending to the second digit storage device, Fig. 7, thus completing a circuit for relays 304 and 305 in series. Upon energizing, these relays connect the ten digit relays 321 to 320, inclusive, to the ten conductors coming from the digit keys. In this manner the second digit storage device is prepared for registering the second digit.

It will be clear now that when the No. 5 digit key is depressed, a circuit will be closed over conductor 235 for the fifth digit relay 325 of the second digit storage device. Upon energizing, relay 325 prepares a locking circuit for itself at its armature 331, connects the grounded conductor 228 to the lamp conductor 335 at armature 333, thereby displaying the No. 5 digit in the second digit bank of the lamp indicating device, and connects conductor 388 to conductor 265 at armature 332. The latter conductor extends to the lower bank of the sending switch S and terminates there in bank contact 295. When the No. 5 digit key is released, ground is removed from conductor 235 and relay 325 becomes locked in series with relay 303 over conductor 285. Relay 303 is accordingly energized in series with relay 325 and at its armature 312 breaks the circuit of relays 304 and 305, whereupon these relays fall back and disconnect the digit relays 321–320, inclusive, from the conductors coming from the digit keys. Relay 303 also grounds the holding conductor 223 at its armature 311, and at its armature 310 grounds the conductor 385 which extends to the third digit storage device, thereby completing a circuit for the relays, corresponding to relays 304 and 305, which connect the ten digit relays of the third digit storage device with the conductors coming from the digit keys.

When the operator depresses the No. 6 digit key, a circuit is completed over conductor 236 for the sixth digit relay in the third digit storage device and this relay is energized with a result similar to that described in the case of the two previously energized digit relays, and it follows that the digit 6 is displayed in the third digit bank of the lamp indicating device, and a circuit is prepared for grounding conductor 266 which extends to the lower bank of the sending switch S and terminates there in bank contact 296. When the operator releases the No. 6 digit key, the sixth digit relay in the third digit storage device becomes locked in series with the associated relay, corresponding to relay 303 of the second digit storage device, and this relay, upon energizing, breaks the circuit of the relays through the medium of which the digit relays were connected to the conductors coming from the digit keys, whereby these digit relays are again disconnected. Ground is also placed upon the holding conductor 223 in the third digit storage device and at the same time ground is placed upon the conductor, corresponding to conductor 385, which extends to the fourth digit storage device, whereupon a circuit is completed for a pair of relays in said device, corresponding to the relays 304 and 305 of the second digit storage device, these relays having the function of connecting up the ten digit relays of the fourth digit storage device to the conductors coming from the digit keys.

When the No. 7 digit key is depressed, the operations which take place at the fourth digit storage device are similar to those described in the case of the other storage devices. The No. 7 digit relay is energized over conductor 237, and this relay causes the digit 7 to be displayed at the fourth digit bank of the lamp indicating device and also prepares a circuit for grounding conductor 267, which conductor terminates in bank contact 297 of the sending switch S. After the No. 7 digit key is released, the energized digit relay becomes locked in series with a relay, corresponding to relay 303, which is energized in order to ground the holding conductor 223 and also to break the circuit of the relays which have previously been effective to connect the ten digit relays of the fourth digit storage device with the conductors coming from the digit keys.

From the foregoing, it will be understood that the fourth, fifth, sixth and seventh digit relays in the first, second, third, and fourth storage devices, respectively, are now locked up, with the result that the telephone number 4567 has been displayed on the lamp indicating device, and with the further result that bank contact 294 of the sending switch S has been grounded, while bank contacts 295, 296 and 297 have been connected with in the last three storage devices, respectively, wherein circuits have been prepared for grounding these bank contacts also at the proper time. It should be remembered also that the holding conductor 223 has been grounded at each of the four storage devices. The pilot lamp $L^4$, which is located in line with the digit keys of the sender, upon which the number has just been registered, is also lighted inasmuch as it is connected with the grounded holding conductor 223. The function of the lamp indicating device, upon which the digits are displayed as fast as they are registered, is to indicate completed telephone numbers to the B operator with a view to affording her a check on the accuracy of her work. In order to obtain the best results and the maximum speed of operation it is intended that the B operator will register the digits in the telephone numbers as they are transmitted to her by the A operator, from which it will be evident that the digit keys are necessarily operated with great rapidity, and in quick succession. Although an experienced operator soon becomes accustomed to this and will make very few mistakes, there will be times nevertheless when she is interrupted in her work or for some other reason is uncertain whether she has registered the correct number or not, and as such times the lamp indicating device affords a convenient method of at once ascertaining what number has actually been registered. If it is not desired to use the indicating device constantly, a key may be inserted in the battery conductor in order to disconnect the current supply from the lamps, and the key may then be operated whenever it is desired to show up some particular number. In case an inspection of the indicating device should show that a telephone number has been registered inaccurately, the release key R may be actuated in order to energize relay 203 for the purpose of restoring the digit relays of the several storage devices to normal position. The manner in which this is accomplished by the operation of relay 203 will be clear from the subsequent explanation of the restoration of these relays under ordinary circumstances, consequently it will not be necessary to make any detailed explanation of it at this time.

Having completed the registration of the number, the B operator assigns a trunk to the A operator, as previously explained, and as soon as the A operator has taken the trunk, as indicated by the lighting of the busy lamp $L^3$, the B operator will actuate the trunk key K′. By this means a circuit is completed for the upper winding of relay 45 by way of grounded conductor 56. Upon energizing, relay 45 locks itself to the grounded holding conductor 223 at its armature 52, closes a circuit for the upper winding of relay 44 at armature 51, and at armatures 50 and 53 connects the trunk conductors 60 and 61 with the conductors 221 and 222 coming from the sending switch S, Fig. 5. Conductors 221 and 222 are normally connected together at armature 212 and also at armature 214 of relays 201 and 202 of the sending switch S, and it follows, therefore, that a circuit is completed over the trunk conductors 60 and 61 for the line relay 65 of the first selector D, Fig. 3. Upon energizing, relay 65 closes a circuit for the slow acting release relay 66. The latter relay, upon energizing, opens a point in the circuit of the release magnet 72 and prepares a circuit for the vertical magnet 70 in the customary manner.

Relay 44 is operated when the circuit is closed through its upper winding and completes a locking circuit for itself at its armature 48. In addition relay 44 closes a pair of contacts in the trunk conductors in order that when the relay 45 deenergizes, as will occur shortly, the said trunk line may extend continuously through the operator's position. When relay 45 is energized, as just explained, the conductor 224 is grounded, being connected with conductor 223 at armature 52, and a circuit is completed for slow acting relay 204, Fig. 5. Upon energizing, relay 204 closes a circuit for slow acting relay 205 at its armature 217 and at its armature 218 disconnects ground from the conductor 228. The latter operation extinguishes the lights in the lamp indicating device, and when the slow acting relay 205 pulls up it opens the normal ground connection to conductor 226 at its armature 219 and substitutes therefor a ground coming from the working contact of armature 218 of relay 204. Since relay 204 is already energized and since the contacts at armature 219 are of the make before break type, conductor 226 is held grounded continuously during this operation. In addition to causing the operation of relays 204 and 205, the grounding of conductor 224 produces another result, which is the closure of a circuit for the impulsing relay 202. This circuit is broken at the rate of about ten times per second by the constantly rotating cam 298, and the circuit is accordingly closed the first time the said cam comes into the proper position after the conductor 224 is grounded. Relay 202 is now intermittently energized and deenergized by the operation of cam 298. At the first energization relay 202 does not open the circuit of the line relay 65 of the first selector D at armature 214 because this circuit is closed also at armature 212 of relay 201. At armature 215, however, a circuit is completed for the stepping magnet 206 of the sending switch S and this magnet is energized. Upon the deenergization of relay 202 the circuit of the stepping magnet 206 is broken and the said magnet retracts its armature, thereby advancing the wipers 207 and 208 one step. The wiper 207 now engages the first grounded contact in its associated bank and thereby closes a circuit for the slow acting relay 201 which energizes and prepares a locking circuit for slow acting relay 200. Relay 201 also opens, at armature 212, the shunt circuit which normally renders the impulsing relay 202 ineffective to interrupt the circuit of the line relay of the selector D. The impulsing relay 202 continues to be energized and deenergized intermittently by the operation of the cam 298, and at each energization this relay will separate the two conductors 221 and 222 and will thereby produce a series of interruptions in the circuit of the line relay 65 of the selector D. At the same time relay 202 transmits a series of impulses to the stepping magnet 206 at armature 215, and the sending switch S is thus driven synchronously with the first selector. After four interruptions have been produced in this way, the stepping magnet 206 will have been energized four more times, and the wiper 208 will be advanced into engagement with the now grounded bank contact 294. A circuit is thus completed for the slow acting relay 200, which immediately energizes, establishing a locking circuit for itself at its armature 210, and at its armature 211 opens the circuit of the impulsing relay 202, thus preventing the transmission of any more impulses over the trunk circuit for the time being. Relay 200 also closes a new circuit for the stepping magnet 206 at armature 209, and since this circuit includes an interrupter contact controlled by the stepping magnet itself, the said stepping magnet will operate in the manner of a buzzer and the switch will be advanced automatically until wiper 207 arrives at the first ungrounded contact in its bank which, as shown in the drawing, is the twelfth bank contact. During this time certain operations are taking place at the first digit storage device which will now be explained.

At the same time that a circuit is completed for relay 200 by the arrival of wiper 208 at grounded bank contact 294, a circuit is completed by this wiper which extends over conductor 227 and by way of armature 255 and its resting contact to relay 251 at the first digit storage device, thus energizing this relay. As explained before, the switch S continues to advance its wipers and as soon as wiper 207 reaches its twelfth bank contact, relays 201 and 200 are deenergized, as is explained more in detail hereinafter. Ground is thus removed from conductor 227, and relay 251 will become locked in operated position over a circuit which includes relay 250 and the grounded conductor 226. Relay 250 is, therefore, energized with the result that conductor 227 is disconnected from relay 251 and is transferred by way of conductor 287 to the corresponding relay 302 of the second digit storage device. Further results of the energization of relay 250 are the opening of the ground connection at armature 257 to the holding conductor 223 in the first digit storage device (it will be recollected that this holding conductor is still grounded in each of the other three storage devices); the removal of ground from conductor 288, at armature 256, whereby ground is disconnected from bank contact 294 in the bank of the sending switch S; and the grounding of conductor 286 at the same armature 256, whereby ground is extended by way of the energized digit relay 325 of the second digit storage device, and conductor 265 to bank contact 295 of the sending switch S. The operations so far described have resulted in the transmission of a series of four impulses to the selector D, or more specifically speaking, the circuit of the line relay 65 of the said selector has been interrupted four times and in response to these interruptions the selector is operated to raise its wiper to the fourth level, and at the end of the series of impulses it operates automatically to select an idle trunk leading to a second selector, such as the second selector E.

Returning again to the operation of the sending switch, when the wiper 207 arrives at the twelfth contact in its associated bank, which is ungrounded, the circuit of the slow acting relay 201 is broken and after an instant this relay will fall back, thus opening the locking circuit of slow acting relay 200 and at the same time closing the normal shunt circuit around the impulsing contact at armature 214 of the impulsing relay 202. Its circuit having been broken, the slow acting relay 200 also deenergizes after a brief instant and at its armature 211 again closes the circuit of the impulsing relay 202. This relay now begins operating as before and on its first energization transmits an impulse of current to the stepping magnet 206 without, however, interrupting the switch control circuit over the trunk line, which now extends through to the second selector E. On the first step of the sending switch S, wiper 207 arrives at the thirteenth bank contact and since this contact is grounded a circuit is completed for the slow acting relay 201 which operates to open the shunt circuit at its armature 212 as before. Subsequent energizations of the impulsing relay 202 now cause the control circuit extending to the selector E to be interrupted a plurality of times, while at the same time the stepping magnet 206 is intermittently energized to drive the wipers of the sending switch. When wiper 208 arrives at the eighteenth contact in its associated bank, which contact is connected in multiple with the bank contact 295, a circuit will be completed for relay 200, and this relay is energized as before to open the circuit of the impulsing relay 202 and thus stop the further transmission of impulses. Relay 200 also closes the usual circuit for continuing the operation of the stepping magnet 206 and the sending switch is, therefore, continued in motion until the wiper 207 arrives at the next ungrounded bank contact, which is the twenty-fifth. At the same time that relay 200 is energized, a circuit is completed by way of conductors 227 and 287 for relay 302 in the second digit storage device and the said relay 302 is energized. As the sending switch continues its advance, this circuit is broken and relay 302 becomes locked in series with relay 301 to the grounded conductor 285. Relay 301 is accordingly energized and at its armature 306 disconnects conductor 287 from the winding of relay 302 and transfers it by way of conductor 387 to a similar relay in the third digit storage device. In addition, relay 301 disconnects the grounded conductor 286 from conductor 388, thereby removing ground from the bank contact 295 in the bank of the sending switch S, and transfers it into connection with conductor 386, whereby ground is extended by way of the now energized sixth digit relay in the third digit storage device, to bank contact 296 in the bank of the sending switch, and at armature 308 of relay 301 the ground connection to the holding conductor 223 in the second digit storage device is broken.

The second series of operations at the operator's sending equipment resulted in the transmission of five impulses to the selector E, or rather in the production of five interruptions in the circuit of its line relay 90, whereby the switch shaft and wipers are raised opposite the fifth level of bank contacts. Upon the cessation of the series of impulses, the second selector E automatically operates to select an idle trunk leading to a connector switch, such as the connector H, Fig. 4.

When the wiper 207 of the sending switch arrives at the twenty-fifth bank contact it finds this contact ungrounded, the advance of the switch is stopped temporarily, and relay 201 is deenergized, thus again shunting the impulsing contact at armature 214. After a brief further interval, the slow acting relay 200 will fall back and again close the circuit of impulsing relay 202, which now begins operating as before, and produces a series of interruptions in the control circuit of the connector H to operate this switch vertically, while at the same time the impulses are transmitted to the stepping magnet 206, in order to drive the sending switch S. It is understood, of course, that the first energization of relay 202 is ineffective to interrupt the control circuit. It will be unnecessary to minutely consider all the operations which take place during the transmission of the third and fourth series of impulses. The third series is terminated by the arrival of wiper 208 at grounded bank contact 296 which causes relay 200 to be energized, in order to advance the sending switch automatically to the twelfth contact in its bank, and which closes a circuit over conductors 227, 287 and 387 to the relay in the third digit storage device which corresponds to relay 302 of the second digit storage device. Upon the removal of ground from conductor 227 by the further advance of the sending switch S, a relay in the third digit storage device, corresponding to relay 301 of the second digit storage device, is energized and various transfer operations take place which result in the removal of ground from bank contact 296 and in the grounding of bank contact 297.

The connector H responds to the third series of impulses, and its shaft and wipers are raised five steps until they stand opposite the fifth level of bank contacts. No automatic movement takes place at the connector, however, upon the cessation of the series of impulses and further movement of the connector is deferred until the arrival of the next series of impulses.

When the wipers of the sending switch S arrive at the twelfth set of bank contacts, wiper 207 will find no ground and relays 201 and 200 are accordingly deenergized to again start the operation of the switch. The impulsing relay 202 now begins to step the switch S around as before, and after the first step begins to transmit the final series of impulses over the control circuit to the connector H. This last series of impulses is terminated by the arrival of wiper 208 at the twentieth contact in its bank which is connected in multiple with bank contact 297 and which is, therefore, grounded. When this occurs, relay 200 is energized as usual to stop the transmission of impulses and to close the automatic stepping circuit for the stepping magnet 206 of the sending switch. At the same time conductor 227 is grounded, and a circuit is completed over said conductor and conductors 287 and 387 and thence by way of a similar conductor, in the third digit storage device, to a relay in the fourth digit storage device, which corresponds to relay 302 of the second digit storage device. As the sending switch continues its advance ground is removed from conductor 227, whereupon a transfer relay in the fourth digit storage device, which corresponds to transfer relay 301 of the second digit storage device, is energized. Since the fourth digit storage device is the last one, it will be apparent that those conductors, corresponding to conductors 385, 386, and 387, will be omitted, and the principal result of the operation of the transfer relay is the removal of ground from the holding conductor 223. Ground has already been removed from this holding conductor at each of the other three storage devices, and it follows that conductor 223 will now be entirely clear of ground. At the same time that conductor 223 is cleared, conductor 224 is cleared of ground also for this conductor has been maintained grounded through its connection with conductor 223 at armature 52 of relay 45. The removal of ground from conductor 224 permanently opens the circuit of the impulsing relay 202 and thus prevents any further operation of the sending switch S at this time. The removal of ground from conductor 224 also causes the deenergization of the slow acting relay 204, which opens the circuit of the slow acting relay 205 at armature 217 and at the same time disconnects ground from conductor 226 at armature 218. As a result of the latter operation, and before relay 205 deenergizes, relays 250, 251, 252, and 274 of the first digit storage device are deenergized. Relay 252, upon deenergizing, opens the circuit of relays 253 and 254 which are thus deenergized also, and also removes ground from conductor 285 at armature 259. By the latter operation relays 301, 302, 303, and 325 of the second digit storage device are deenergized. Relay 303, upon deenergizing, removes ground from conductor 385 extending to the third digit storage device, and as a result the corresponding relays in this storage device are deenergized also. In a similar way, the relays in the fourth digit storage device, which have been locked up, are deenergized an instant later. The operator's sending equipment, including the four digit storage devices and the sending switch S, is thus entirely restored to normal position and is ready for use again in registering another telephone number.

At the trunk line, Fig. 2, when ground is removed from the holding conductor 223 the locking circuit of relay 45 is broken and thus the relay is accordingly deenergized. As a result the circuit of relay 44 is broken, but this relay remains locked up to the grounded conductor 56 at its armature 48. By the deenergization of relay 45, the incoming conductors 30 and 31 of the inter-office trunk line, are connected through the two condensers by way of armatures 47 and 49 of relay 44, and through the normally closed sets of contact springs controlled by relays 45 and 46 to the outgoing trunk conductors 60 and 61, which have been extended by the operation of selectors D and E and the connector H, to the desired called line. It will be observed that there is a bridge across the trunk conductors 60 and 61 at the B operator's position which includes the impedance coil 43 and upper winding of the electropolarized relay 42. Thus, the continuity of the switch control circuit extending through to the connector H is preserved and the switches are prevented from releasing. The two windings of relay 42 are in opposition at this time and consequently this relay is not operated.

The operation of the automatic switches will now be explained a little more in detail, in order that the entire system may be fully understood without reference to other publications. As previously explained, the control circuit of the first selector D includes the conductors 221 and 222 coming from the sending switch S, and the trunk conductors 60 and 61, and when the first series of interruptions is produced in this circuit by the intermittent impulsing relay 202 of the said sending switch, the line relay 65 of the first selector is caused to retract its armature a corresponding plurality of times. At each retraction of its armature, relay 65 sends a current impulse through the slow acting series relay 67 and the vertical magnet 70 in series, and the vertical magnet is operated to raise the switch shaft step by step until the wipers 80, 81, and 82 stand opposite the fourth level of bank contacts. Relay 67 is energized in series with the vertical magnet, and being slow acting retains its armature in operated position throughout the vertical movement of the switch. At the first upward step, the off normal springs 78 are closed and since relay 67 is in operated position a circuit is completed for the stepping relay 68. Upon energizing, relay 68 establishes a locking circuit for itself at its upper armature, and at its lower armature prepares a circuit for the rotary magnet 71. At the end of the vertical movement of the switch, the slow acting relay 67 is deenergized and closes the circuit of the rotary magnet 71 which accordingly operates to rotate the switch shaft one step and brings the switch wipers into engagement with the first set of bank contacts in the fourth level. At the same time the rotary magnet opens its interrupter contact and thus breaks the locking circuit of the stepping relay 68, which accordingly deenergizes and breaks the circuit of the rotary magnet which thereupon deenergizes also and again closes its interrupter contact. The operation now depends upon whether the trunk line terminating in the first set of contacts is busy or idle. If this trunk line is busy, there will be a ground potential on the test contact engaged by the test wiper 81 and the stepping relay 68 will again be energized, resulting in another closure of the rotary magnet circuit and the advance of the switch wipers into engagement with the second set of bank contacts, and this operation will continue as long as the test wiper 81 continues to engage grounded test contacts. When the first idle trunk line is reached, which we will assume to be the trunk line extending to the second selector E, the test wiper 81 will find no ground potential on the test contact 84 and the stepping relay 68 will not again be operated. Instead, the switching relay 69, which has heretofore been short circuited, is energized in series with the stepping relay 68, the latter relay remaining inoperative due to the high resistance of the said switching relay. Upon energizing, relay 69 grounds the test wiper 81 at its armature 75 in order to make the selected trunk line busy, and at its armatures 74 and 77 disconnects the trunk conductors 60 and 61 from the winding of the line relay 65 and extends them by way of wipers 80 and 82, bank contacts 83 and 85, conductors 86 and 88, and armatures 94 and 96 and their resting contacts to the upper and lower windings of the line relay 90 of the second selector E.

When the trunk conductors are extended to the selector E, as above described, the line relay 90 is energized and closes a circuit for the slow acting release relay 91. Upon energizing, relay 91 prepares the selector for operation in its vertical movement in the usual manner, and also connects ground to the release-trunk conductor 87, thereby establishing a holding circuit which extends by way of said conductor 87, test contact 84, test wiper 81, armature 75 and its working contact, winding of the switching relay 69, interrupter contacts of the rotary magnet 71, off normal springs 78, and the winding of the stepping relay 68 to battery.

The operations just described whereby trunk conductors 60 and 61 have been extended through to the second selector E have occurred in response to the transmission of the first series of impulses by the sending switch S. The automatic rotary movement of the selector D in selecting an idle trunk line in the particular level, which was selected under the directive control of the sender, takes place during the time interval between the transmission of the first and second series of impulses. It will be recollected that this time interval is introduced by the relays 201 and 200, of the sending switch, which are slow acting and which, therefore, require an appreciable length of time to fall back. It may be apprehended that an additional time interval is introduced between each two series of impulses, owing to the fact that the sending switch S is forced to complete its travel from one of its normal positions to the next each time a series of impulses is transmitted. This is true to a certain extent, but the time interval thus introduced is so short as to be inappreciable. The switch S travels over its bank contacts at a rate of about sixty per second when it is advancing its wipers automatically.

When the next series of impulses come in over the trunk conductors 60 and 61, the line relay 90 of the second selector E is deenergized a plurality of times and controls the vertical magnet 92 to raise the shaft and wipers 100–102, inclusive, to the fifth level, the second digit in the number being the digit 5, as explained heretofore. The operation of the second selector E is precisely the same as that of the first selector D, and consequently it will be unnecessary to consider it in detail. It will be sufficient to say that at the end of the vertical movement of the switch, the rotary movement is initiated automatically and the wipers are rotated step by step in search of an idle trunk line leading to a connector switch. Assuming that the first idle trunk line encountered is the one shown in the drawing and extending to the connector H, Fig. 4, when the test wiper 100 arrives at test contact 104 it will find the said test contact unguarded, and the selecting movement of the switch will be arrested. The switching relay 99 is now energized, and the trunk conductors 86 and 88 incoming to the selector are disconnected from the windings of the line relay 90 and are extended by way of armatures 94 and 96 and their working contacts, wipers 100 and 102, bank contacts 103 and 105, conductors 106 and 108, normally closed contact springs of the back bridge relay 110 to the upper and lower windings of the double wound line relay 111 of the connector H.

On the extension of the control circuit to the connector H in the above manner, the line relay 111 is energized and completes a circuit for the slow acting release relay 112. Upon energizing, relay 112 prepares the connector for operation in its vertical movement in the usual way and at armature 125 connects ground to the release trunk conductor 107. A holding circuit is thus established which extends by way of the said conductor 107, test contact 104, test wiper 101, and armature 95 and its working contact, to conductor 87 where it joins a previously described holding circuit extending back to the first selector D. The switching relay 99 at the second selector E is connected to the holding circuit the same as was described in the case of the switching relay 69 of the first selector.

When the third series of impulses, corresponding to the digit 6, are transmitted over the control circuit by the operator's sender, the line relay 111 of the connector H is momentarily deenergized six times and at each deenergization transmits an impulse of current to the vertical magnet 118 over a path which extends from ground by way of armature 124 and its resting contact, armature 126 and its working contact, off normal springs 121 and 123, winding of the slow acting series relay 113, and the winding of the vertical magnet 118 to battery. By the operation of the vertical magnet the wipers 150–152, inclusive, are raised step by step until they stand opposite the sixth level of bank contacts. Relay 113 is energized in series with the vertical magnet 118 and being slow acting holds up continuously during the vertical operation of the switch. By the operation of this relay, the vertical magnet circuit is preserved intact, notwithstanding the shifting of the off normal springs, which occurs at the first vertical step of the switch. At the end of the vertical movement, relay 113 deenergizes and transfers the operating circuit to the rotary magnet 119.

The last series of impulses comprises seven interruptions in the control circuit corresponding to the final digit 7 of the called telephone number. Responsive to these interruptions the line relay 111 is deenergized seven times and now sends impulses to the rotary magnet 119 over the following circuit: From ground by way of armature 124 and its resting contact, armature 126 and its working contact, off normal springs 121 and 122, armature 127 and its resting contact, resting contact of armature 132 and the said armature, armature 139 and its resting contact, and the winding of the rotary magnet 119 to the battery. By the operation of the rotary magnet, the wipers 150–152, inclusive, are rotated step by step and are finally brought to rest in engagement with the particular set of bank contacts in which the line of substation A′ is terminated, these contacts being indicated in the drawings by reference characters 153, 154 and 155. The slow acting relay 116 is energized in parallel with the rotary magnet and remains continuously energized during the rotary movement. In operated position, relay 116 connects the test wiper 151 to the winding of the test relay 115 by means of its armature 133 and at armature 135 closes an alternative point in the circuit of the rotary magnet, to guard against the possibility of having this circuit opened by the operation of the test relay while the test wiper 151 is passing over grounded test contacts.

The final series of impulses has now been received, and the connector wipers have been placed in connection with the terminals of the called line. If the line is busy there will be a ground potential on the test contact 154 and the test relay 115 will be energized. When this relay operates it prepares a locking circuit for itself at its armature 131, which is completed when the slow acting relay 116 falls back an instant later, opens the rotary magnet circuit at armature 132, and at armature 134 connects a lead from the busy signalling machine to the lower side of the line. By this time the relay 45 at the B operator's position has been deenergized, the operator's sender has been disconnected, and the trunk conductors 30 and 31 have been connected through by way of the condensers to the trunk conductors 60 and 61, respectively, all as previously explained. It will be evident then that an audible busy signal will be transmitted to the calling subscriber in the distant manual exchange. On perceiving the signal, the subscriber will replace his receiver thereby signalling the operator who will pull down the connection and the automatic switches will be released, as will be explained subsequently.

Suppose now that the called line is idle when connection therewith is attempted. Under these circumstances there will be no ground on the test contact 154, and the test relay 115 will not be energized. Then when the slow acting relay 116 falls back a circuit is completed for the switching relay 117 which may be traced from the grounded conductor 107 by way of armature 131 and its resting contact, the upper winding of the switching relay 117, resting contact of armature 133 and the said armature, test wiper 151, test contact 154, winding of the cut off or switching relay 162 of the line switch C, and winding of the stepping magnet 164 to battery. Relays 117 and 162 are energized in series over this circuit, and the latter relay is effective to clear the line conductors 160 and 161 of their normal battery and ground connections in the line switch. It may be explained that owing to a mechanical interlocking device between the armatures of the switching relay 162 and the line relay 163, the former relay is operated only about half way at this time, and the wipers of the line switch are not connected up.

At the connector H, when the switching relay 117 pulls up, it establishes a locking circuit for itself at armature 138, grounds the test wiper 151 at armature 137, opens the rotary magnet circuit at armature 139, and at armatures 136 and 140 connects up the two line wipers 150 and 152. By the latter operation a signalling circuit is established whereby ringing current from the generator GEN is intermittently projected out over the called line to operate the bridged ringer at substation A′, and notify the called subscriber that he is wanted. The return path for the ringing current includes the upper winding of the ring cut off relay 114, and when the called subscriber answers this relay is operated. Upon energizing, relay 114 establishes a locking circuit for itself at its armature 129, breaks the ringing circuit at armatures 128 and 130, and at the working contacts of these same armatures finally completes the talking connection.

Current is now supplied to the transmitter at substation A′ through the windings of the double wound back bridge relay 110 which is accordingly energized. This relay is a reversing relay and has the well known function of reversing the incoming trunk conductors 106 and 108 as regards their connections with the windings of the line relay 111. It will be recalled now that the circuit of the line relay 111 is completed by way of the bridge through the impedance coil 43, and the upper winding of the electropolarized relay 42 in the trunk equipment at the B operator's position, the operator's sender having been disconnected by this time, and the operation of the reversing relay 110, therefore, will reverse the direction of current flow in the trunk line and more particularly in the bridge thereof which includes the upper winding of the said electropolarized relay 42. As a result, the two windings of this relay now co-operate and it is able to attract its armature whereby the upper high resistance winding of relay 40 is shunted by means of the relatively low resistance impedance coil 41. Relay 40 remains energized, owing to the fact that its lower winding is still connected in the bridge across conductors 30 and 31, and the result of shunting out the upper high resistance winding of this relay is to augment the flow of current sufficiently to operate the supervisory relay 7 at the operator's cord circuit in the manual exchange. This serves to extinguish the supervisory lamp $L^2$ and notifies the operator that the called subscriber in the automatic exchange has answered his telephone. The subscribers may now converse as desired.

When the subscribers are through talking, they will replace their receivers. By the replacement of the receiver at substation A, the supervisory relay 8 is deenergized, and the supervisory lamp L′ is lighted. When the subscriber at substation A′ replaces his receiver the back bridge relay 110 in the connector H is deenergized and the direction of current flow in the section of the trunk to the right of the condensers is reversed to normal thereby causing the electropolarized relay 42 to retract its armature. By this operation the upper high resistance winding of relay 40 is again included in the circuit of the supervisory relay 7 at the A operator's cord circuit and this relay is deenergized to light the supervisory lamp $L^2$. By the disconnect signals thus given the operator she is advised that the conversation is finished and she will accordingly pull down the connection. When the plug is removed from the jack J′ the circuit over which relay 40 at the B operator's position has been maintained energized, is broken and relay 40 will accordingly fall back and remove ground from conductor 56. This extinguishes the busy lamp $L^3$ and also breaks the locking circuit of relay 44. On deenergizing, relay 44 opens the trunk line at armatures 47 and 49, thereby clearing the bridge across the trunk conductors 60 and 61. As a result, the line and release relays 111 and 112 of the connector H are permitted to fall back and these relays jointly close a circuit for the release magnet 120, whereby the connector H is restored to normal in the usual manner. Relay 112 also removes ground from the release trunk conductor 107 and this operation breaks the holding circuit for the switching relays 69 and 99 of the selectors D and E, respectively. These relays are, therefore, deenergized and circuits are completed for release magnets 72 and 93 which operate to restore their associated switches to normal position. All the apparatus is thus returned to normal and is ready for use in setting up other connections.

It will be seen from the foregoing that I have devised a simple and efficient arrangement of circuits and apparatus for handling calls between manual and automatic exchanges, introducing a variety of new features which not only simplify and reduce the cost of the equipment, but add to the speed and facility with which necessary duties are performed by the operators.

Having described my invention, what I consider to be new and desire to have protected by Letters Patent will be pointed out in the appended claims.

What I claim is:

1. In a telephone system, A and B operator's positions, trunk lines coming from the A operator's position and passing through the B operator's position to automatic switches, other automatic switches, means for manually connecting a calling line with one of said trunk lines at the A operator's position, an operator's sender at the B position comprising a progressively movable sending switch and a plurality of storage devices, said sending switch including a contact device, means whereby the B operator can register the digits in the number of the called line on said devices, means for connecting the sender with the trunk line in use, means whereby the sending switch is then controlled by said storage devices successively to transmit series of impulses over the trunk conductors by means of said contact device to operate a series of said switches to connect with the called line, and means for automatically disconnecting the sender when the connection is completed.

2. In a telephone system, A and B operator's positions, trunk lines coming from the A operator's position and passing through the B operator's position to automatic switches, other automatic switches, a call circuit extending between said positions whereby the A operator can transmit a desired called number to the B operator, an operator's sender at the B position comprising a progressively movable sending switch and a plurality of storage devices, said sending switch including an interrupter, means whereby the B operator can register the digits in the called number on said devices, manual means at the A operator's position for connecting a calling line with a particular one of said trunk lines assigned by the B operator over said call circuit, means whereby the B operator can connect said sender with the trunk line assigned, and means for then automatically operating said sending switch under the control of said storage devices to transmit a plurality of series of impulses over the trunk conductors by means of said interrupter to operate a series of said switches to complete the connection to the called line.

3. In an operator's sender for controlling automatic switches, a set of digit keys, one for each digit, a plurality of storage devices each comprising a set of digit relays, one relay for each digit, means whereby the successive actuation of a plurality of digit keys causes the energization of a particular digit relay in each of said storage devices, an impulse sending mechanism, and means for placing said mechanism under control of said storage devices successively.

4. In an operator's sender for controlling automatic switches, a set of digit keys, a plurality of storage devices each comprising a set of digit relays, the digit relays of the first device being normally connected with said keys, and transfer relays and circuits effective to disconnect the digit relays of one device from said keys and to connect the digit relays of another device whenever a digit key is operated and released.

5. In an operator's sender for controlling automatic switches, a plurality of storage devices each comprising a set of digit relays, a common set of digit keys, a transfer relay in each storage device except the last for shifting the control of said keys from one storage device to the next, means for energizing the corresponding digit relay in one of said devices when any digit key is actuated, and means for energizing the transfer relay in said device in series with the energized digit relay when the actuated digit key is restored.

6. In an operator's sender for controlling automatic switches, a plurality of storage devices each comprising a set of digit relays, a common set of digit keys, a transfer relay in each storage device for shifting the control of said keys from one storage device to the next, means for energizing a digit relay in one of said devices when a digit key is actuated, and means for energizing the transfer relay in said device in series with the energized digit relay when the actuated digit key is restored.

7. In an operator's sender for controlling automatic switches, a plurality of storage devices each comprising a set of digit relays, a common set of digit keys, a transfer relay in each storage device for shifting the control of said keys from one storage device to the next, means for energizing a digit relay in one of said devices when a digit key is actuated, a self locking circuit for the energized digit relay including the associated transfer relay, and circuit connections such that current flow through said transfer relay is delayed until the actuated digit key is restored.

8. In a telephone system, a trunk line terminating in an automatic switch, other switches, an operator's sender comprising a plurality of storage devices, means for registering a digit in a called number on each of said devices, a holding conductor, means for grounding said conductor at each storage device when a digit is registered, an impulse transmitting mechanism, a trunk relay for connecting said mechanism with said trunk line, a locking circuit for said relay including said conductor, means for operating said mechanism to transmit impulses to a series of said switches under the control of said storage devices successively, and means effective to disconnect ground from the said conductor at each storage device in turn as soon as the respective devices complete their control over said mechanism, whereby the said conductor is finally entirely disconnected from ground and the said trunk relay is deenergized.

9. In an operator's sender for controlling automatic switches, a switch control circuit, a step by step switch, a constantly driven interrupter, a relay intermittently energized by said interrupter, contacts on said relay for interrupting said control circuit and other contacts on said relay for sending impulses of current to said switch, and means for preventing said contacts from interrupting said control circuit before an effective impulse is sent to said switch by said other contacts.

10. In an operator's sender for controlling automatic switches, a switch control circuit, a step by step switch, a relay and means for closing an intermittent energizing circuit therefor, contacts on said relay for interrupting said control circuit, contacts on said relay for sending operating impulses to said switch, and circuit connections for preventing the said control circuit from being interrupted until said switch has been moved a definite distance.

11. In an operator's sender for controlling automatic switches, a switch control circuit, a step by step switch, a relay and means for closing an intermittent energizing circuit therefor, contacts on said relay for interrupting said control circuit, contacts on said relay for sending operating impulses to said switch, the said interrupting contacts being normally short circuited, and means controlled in the movement of said switch for opening said short circuit to permit said relay to interrupt said control circuit.

12. In an operator's sender for controlling automatic switches, a switch control circuit, a step by step switch, a relay and means for closing an intermittent energizing circuit therefor, contacts on said relay for interrupting said control circuit, contacts on said relay for sending operating impulses to said switch, and means controlled in the movement of said switch for opening the energizing circuit of said relay after a definite series of interruptions has been produced.

13. In an operator's sender for controlling automatic switches, a switch control circuit, a step by step switch, a relay and means for closing an intermittent energizing circuit therefor, contacts on said relay for interrupting said control circuit, contacts on said relay for sending operating impulses to said switch, means controlled in the movement of said switch for opening the energizing circuit of said relay after a definite series of interruptions has been produced, and a circuit for automatically driving said switch to a normal position independent of said relay.

14. In an operator's sender for controlling automatic switches, a switch control circuit, a step by step switch, a relay and means for closing an intermittent energizing circuit therefor, contacts on said relay for interrupting said control circuit, contacts on said relay for sending operating impulses to said switch, means controlled in the movement of said switch for opening the energizing circuit of said relay after a definite series of interruptions has been produced, a circuit for automatically driving said switch to a normal position independent of said relay, and means effective after a definite time interval for again completing the energizing circuit of said relay in order to produce another series of interruptions.

15. In an operator's sender for controlling automatic switches, a switch control circuit, a step by step switch, a relay and means for closing an intermittent energizing circuit therefor, contacts on said relay for interrupting said control circuit, contacts on said relay for sending operating impulses to said switch, a set of digit keys, means responsive to the actuation of a digit key for grounding a corresponding contact in the bank of said switch, and a second relay energized over a wiper of said switch when it engages the grounded contact for opening the circuit of said first relay.

16. In a telephone system, automatic switches for connecting a calling and called line, operator controlled storage devices for registering the digits in the number of the called line, a visual digit indicator for enabling the operator to check the accuracy of the registration, and an impulse sending device controlled by said storage devices successively to operate a series of said switches to connect said lines.

17. In a telephone system, automatic switches for connecting a calling and called line, operator controlled storage devices for registering the digits in the number of the called line, a visual digit indicator for enabling the operator to check the accuracy of the registration, an impulse sending device controlled by said storage devices successively to operate a series of said switches to connect said lines, and means for effacing the number displayed by said indicator while said switches are being operated.

18. In a telephone system, automatic switches for connecting a calling and called line, an operator's sender for controlling said switches and comprising operator controlled registering devices for registering the digits in the number of the called line, keys common to said devices for setting them successively, and a number indicator for enabling the operator to check the accuracy of the registration.

19. In a telephone system, automatic switches for connecting a calling and called line, an operator's sender for controlling said switches and comprising operator controlled registering devices for registering the digits in the number of the called line, keys common to said devices for setting them successively, a number indicator comprising groups of lamps, and means for lighting the proper lamps to display the registered number to the operator.

20. In a telephone system, automatic switches for connecting a calling and called line, an operator's sender for controlling said switches and comprising operator controlled registering devices for registering the digits in the number of the called line, a number indicator comprising groups of lamps, means for lighting the proper lamps to display the registered number to the operator, and means for extinguishing said lamps when said sender begins to control said switches.

21. In a telephone system, automatic switches for connecting a calling and called line, an operator's sender for controlling said switches, storage devices for controlling said sender and on which the digits in the number of the called line are registered successively and a visual indicator for displaying each digit to the operator as soon as it is registered.

22. In an operator's sender for controlling automatic switches, a control circuit over which impulses are transmitted to the said switches, a step-by-step sending switch for determining the number of impulses transmitted, means for advancing said switch at a slow rate while impulses are being transmitted, means responsive to a predetermined movement of said switch for stopping the transmission of impulses, and means for continuing the advance of said switch at a high rate of speed until the same reaches normal position.

23. In an automatic impulse sender, an impulse generating device, spacing means for causing the impulses to be generated in groups, means including an automatic progressively movable switch for determining the number of impulses in each group by controlling said spacing means, means for advancing said switch at a slow rate of speed while each group of impulses is being generated, and means for advancing said switch at a high rate of speed during the intervals between successive groups.

24. In an automatic impulse sender, a sending relay for generating groups of impulses, a stop relay for determining the number of impulses in each group, a progressively movable switch and means for operating it during the generation of each group of impulses, and a wiper on said switch for controlling said stop relay each time a group of impulses is generated.

25. In an automatic impulse sender, an interrupter for generating groups of impulses, an automatic progressively movable switch operated during the generation of each group of impulses, means for delaying the generation of impulses each time until after the switch has started, and means responsive each time to a predetermined extent of movement of said switch for terminating the group by stopping the generation of impulses.

26. In an automatic impulse sender, an interrupter for generating groups of impulses, a counting device comprising a switch, means for advancing said switch before the generation of each group of impulses and a definite distance per impulse during the generation of each group of impulses, means being provided for restoring said switch to normal after each group of impulses is generated, and means responsive each time to a predetermined movement of said switch for terminating the group of impulses which is being generated.

27. In an automatic impulse sender, an interrupter, for generating groups of impulses, a counting device comprising a switch, means for advancing said switch a definite distance per impulse during the generation of each group of impulses, means being provided for advancing said switch to normal after each group of impulses is generated, means responsive each time to a predetermined movement of said switch for terminating the group of impulses which is being generated, said group terminating means comprising a relay, and circuit arrangements controlled by the switch for energizing the relay at predetermined points in the movement of the switch and for deenergizing the relay whenever the switch reaches normal position.

28. In a telephone system, a trunk line comprising two normally disconnected sections, means for connecting a calling line to the first section, a sender, means individual to said trunk line for associating said sender therewith, storage devices in said sender for registering the digits in the called number, an impulse transmitter in said sender for transmitting series of impulses over the two talking conductors of the second section in series, a counting device controlled by said storage devices successively to determine the values of the several series of impulses transmitted, and a train of automatic switches responsive to said series of impulses to extend the second section of the trunk line to the called line.

29. In a telephone system, a trunk line comprising two normally disconnected sections, means for connecting a calling line to the first section, a sender, means for associating said sender with said trunk line, storage devices in said sender for registering the digits in the called number, each storage device comprising a set of relays, an impulse transmitter in said sender for transmitting series of impulses over the two talking conductors of the second section in series, a counting device controlled by said storage devices successively to determine the values of the several series of impulses transmitted, a train of automatic switches responsive to said series of impulses to extend the second section of the trunk line to the called line, and means for automatically uniting said sections and for freeing the said sender when the setting of said switch train is completed.

30. In a telephone system, a trunk line comprising two normally disconnected sections, means for connecting a calling line to the first section, a sender, means for associating said sender with said trunk line, storage devices in said sender for registering the digits in the called number, an impulse transmitter in said sender for transmitting series of impulses over the two talking conductors of the second section in series, a counting device controlled by said storage devices successively to determine the values of the several series of impulses transmitted, means for accurately synchronizing each series of impulses with the operation of said counting device, a train of automatic switches responsive to said series of impulses to extend the second section of the trunk line to the called line, means for uniting said sections and for freeing said sender, and means in said sender responsive to the completion of the transmission of the last series of impulses for operating said uniting and freeing means.

31. In an automatic impulse sender, an impulse generating device, a counting device, means for operating said devices synchronously to transmit and count predetermined series of impulses, means for insuring that the first impulse of every series will be counted, means for restoring the counting device after each series is finished, and a slow-acting device for introducing a time interval between the successive series.

32. In an automatic impulse sender, a switch control conductor, a contact device for producing series of impulses in said conductor, a counting device individual to said contact device for determining the number of impulses in each of said series, a plurality of storage devices for controlling said counting device, a series of contacts in said counting device through which the control is exercised, and means for placing said contacts in association with said storage devices successively.

33. In an automatic impulse sender, a plurality of storage devices, means for generating series of impulses in accordance with the setting of said storage devices, said means including a counting device initially controlled by the first storage device, a transfer relay for each of the storage devices except the last for shifting the control of said counting device to the next storage device, and a series of digit contacts common to said storage devices through which the control is exercised.

34. In an automatic impulse sender, a plurality of storage devices, keys common to said devices for setting them successively, means for generating series of impulses in accordance with the setting of said storage devices, said means including a counting device, a group of digit conductors terminating in said counting device and adapted to be tested by said counting device when a series of impulses is transmitted, multiple extensions of said conductors terminating in each storage device, contact means in each storage device for placing a potential on any extension terminating therein, each said contact means being electrically inactive while the associated storage device is being set, and means for successively rendering said contact means active.

35. In a telephone system, a trunk line, automatic switches for extending said trunk line to a called line, a sender comprising an impulse transmitter, and a plurality of digit storage devices, said transmitter operable under control of said devices to transmit series of impulses for operating said switches, a relay having contacts for dividing said trunk line into incoming and outgoing sections and for connecting the outgoing section to said sender, and means in said sender for maintaining said relay energized until the last series of impulses has been transmitted.

36. In a telephone system, a trunk line, automatic switches for extending said trunk line to a called line, a sender comprising an impulse transmitter, and a plurality of digit storage devices, said transmitter operable under control of said devices to transmit series of impulses for operating said switches, a relay having contacts for dividing said trunk line into incoming and outgoing sections and for connecting the outgoing section to said sender, a circuit for maintaining said relay energized controlled jointly by all said devices, and means whereby each device relinquishes control over said circuit after it has completed its control of said transmitter so that the said relay is de-energized when the transmission of impulses is completed.

37. In an operator's sender, a set of digit keys, two relay storage devices, means for causing the corresponding relay in one storage device to respond to the actuation of any key in said set, a transfer relay, means including contacts on each of the relays in the first storage device for causing said transfer relay to respond to the release of any actuated key, and means controlled by said transfer relay for rendering the relays of the second storage device responsive to the keys of said set.

38. In an operator's sender, a digit key, a digit relay responsive to an actuation of said key, a second digit relay non-responsive to the first actuation of said key, a transfer relay, and means controlled by the first digit relay and responsive to the restoration of said key for causing said transfer relay to render the second digit relay responsive to the second actuation of said key.

39. In an operator's sender, a digit key, a digit relay responsive to an actuation of said key, a second digit relay non-responsive to the first actuation of said key, a transfer relay, means controlled by the first digit relay and responsive to the restortion of said key for causing said transfer relay to render the second digit relay responsive to the second actuation of said key, and locking circuits for maintaining said digit relays energized independent of said key.

40. In an operator's sender, a digit key of the self-restoring type, said key remaining in operated position only so long as it is held manually, a digit relay responsive to an actuation of said key, a second digit relay normally non-responsive to said key, and a transfer relay responsive to an actuation of the first digit relay and to the restoration of said key to normal for rendering said second digit relay responsive to said key the second time it is actuated.

41. In an operator's sender, a digit key, a digit relay, a circuit for said relay completed responsive to an actuation of said key, a transfer relay energized responsive to the energization of said digit relay over said circuit and to the opening of said circuit, a second digit relay, and a circuit for said second digit relay placed under the control of said key by said transfer relay.

42. In an operator's sender, a digit key, digit storage relays energized successively responsive to successive actuations of said key, and transfer relays energized successively through contacts of the digit storage relays responsive to successive restorations of said key to render the digit storage relays responsive as set forth.

43. In an operator's sender, a digit key, a digit relay, a circuit for said relay controlled by said key, a second digit relay, a circuit for said second relay, a transfer relay for shifting the control of said key from the circuit of the first relay to the circuit of the second relay, and a locking circuit for the said first relay including said transfer relay.

44. In an operator's sender for controlling automatic switches, a switch control circuit, a counting device, means for sending operating impulses to said counting device, means for transmitting impulses over said control circuit, said last means being normally ineffective, and means controlled by said counting device responsive to a predetermined number of operating impulses for rendering said transmitting means effective.

45. In an automatic telephone system, the combination with an automatic switch, of an impulse sender comprising an impulse generating device and a counting device, operating means for said sender, means for placing said sender under control of said operating means at any time while the same is in action in order to generate a series of counted impulses for directively setting said switch, and means for preventing said switch and said counting device from getting out of step due to said sender being placed under control of said operating means at a particular time.

46. In a multi-digit storage device, a plurality of storage relay sets, a single set of actuating conductors, and means for actuating any relay in a storage set over the corresponding conductor and for thereupon transferring said conductors to the next storage relay set responsive to the actuation of said any relay.

47. In a registering device, a plurality of sets of storage relays, a single set of actuating keys, means responsive to any key being actuated and released for transferring the control of said key set to the next relay storage set, means also responsive to the actuation of any key for operating the corresponding relay in the instant connected set of relays, and contacts on said storage relays forming part of the first said means.

48. In a multi-digit register, a plurality of storage relay sets, a plurality of control conductors, means for connecting said conductors to said storage relay sets consecutively, means controlled over said conductors for setting any relay storage set to which they are connected to store a digit, and contacts on said storage relays forming part of the first said means.

49. In a multi-digit register, a plurality of storage relay sets, a plurality of control conductors, means for connecting said conductors to said storage relay sets consecutively, means controlled over said conductors for setting any relay storage set to which they are connected to store a digit, and means whereby the means for transferring said conductors from one relay set to another is controlled over said conductors.

50. In a multi-digit register, a plurality of storage relay sets, a plurality of control conductors, means for connecting said conductors to said storage relay sets consecutively, means controlled over said conductors for setting any relay storage set to which they are connected to store a digit, and means whereby the cessation of the control exercised over any one of said control conductors to set the instant connected relay set brings about the operation of the transfer means to transfer the control conductors to the next storage device.

51. In a relay storage device including a plurality of separately operable storage relays, means for operating any desired ones of said storage relays, a transfer control relay common to the storage relays, and a locking circuit for any operated relay including said control relay.

52. In a plural-digit relay storage device containing a set of relays per digit to be stored, a set of control conductors connected to the first set of relays, means for connecting the conductors to the second set of relays, means for disconnecting said conductors from said first set responsive to the storing of a digit thereon, means also responsive to the storing of the digit on the first set for actuating said connecting means, connecting means for connecting the control conductors with a third relay set, and means responsive to the storing of a digit on the second relay set for de-actuating the first named connecting means to disconnect the conductors from the second storage set and for actuating the second connecting means to connect the control conductors with the third relay set.

53. In a counting relay arrangement in which the relays are operated in successive stages, a plurality of relays representing each stage, means for selectively controlling the relays of the first stage, and means common to the relays of the first stage and arranged to operate in circuit with any one of them for transferring the control to the next stage.

54. In a counting relay arrangement in which the relays are operated in successive stages, separately operable relays representing each of certain stages, and a single transfer control circuit at each of said certain stages, said transfer control circuit having as many branches at a counting relay stage as there are counting relays at such stage.

55. In a telephone system, first and second manual switchboards, automatic switches, trunk lines extending between said first switchboard and certain of said automatic switches by way of the second switchboard, a plurality of register senders at said second switchboard, means for taking any idle sender for use and for connecting it to any one of said trunk lines, means for operating a train of said automatic switches under the control of said register sender to set up a connection to a called line, a trunk-busy lamp individual to each trunk line and means for lighting a given lamp when a connection is completed to the corresponding trunk line at the first switchboard regardless of whether or not a sender is connected with the trunk line at the second switchboard, a sender-busy lamp individual to each sender and means for lighting a given lamp when the corresponding sender is busy whether the sender is connected with a trunk line or not, and a lamp per trunk per sender and means for lighting one of the last named lamps responsive to the corresponding sender being connected with the corresponding trunk line.

56. In a telephone system, first and second manual switchboards, automatic switches, trunk lines extending between said first switchboard and certain of said automatic switches by way of the second switchboard, a plurality of register senders at said second switchboard, means for taking any idle sender for use and for connecting it to any one of said trunk lines, means for operating a train of said automatic switches under the control of said register sender to set up a connection to a called line, a trunk-busy lamp individual to each trunk line and means for lighting a given lamp when a connection is completed to the corresponding trunk line at the first switchboard regardless of whether or not a sender is connected with the trunk line at the second switchboard, a sender-busy lamp individual to each sender and means for lighting a given lamp when the corresponding sender is busy whether the sender is connected with a trunk line or not, and means individual to each trunk line for indicating to the operator when the corresponding trunk line is connected with a sender.

57. In a telephone system, a first operator's switchboard, a second operator's switchboard, automatic switches, trunk lines extending from the first switchboard to certain of said automatic switches by way of said second switchboard, a plurality of senders at said second switchboard, means whereby the operator at said second switchboard can register a desired number on one of said senders, means whereby the operator can subsequently connect the prepared sender with a trunk line over which the call is to be completed, and means for preventing the last named operation until the connection to the trunk line has been completed at the first switchboard.

58. In a telephone system, a first operator's switchboard, a second operator's switchboard, automatic switches, trunk lines extending from the first switchboard to certain of said automatic switches by way of the second switchboard, a plurality of impulse senders at the second switchboard, means for operating one of said senders under the control of the operator at the second switchboard to transmit series of impulses to operate a train of said automatic switches over one of said trunk lines to set up a desired connection, and means for preventing the transmission of impulses until the connection to the trunk line over which they are to be transmitted has been completed at the first switchboard.

59. In an impulse transmitting system, an impulse transmitter including a counting device operable in successive stages under the control of an impulse sending device, an outgoing impulse circuit normally out from under the control of said impulse sending device, means responsive to said counting device reaching a predetermined stage for placing said outgoing impulse circuit under the control of said impulse device, and means responsive to the arrival of said counting switch in a second predetermined position for removing said impulse circuit from under the control of said impulse sending device.

60. In a step-by-step impulse-sending-control device having a normal position, an outgoing impulse circuit, means for starting the operating of said step-by-step device, a slow acting pick-up relay and means for energizing it to start the transmission of impulses over said outgoing circuit responsive to said device arriving in a certain position, a slow acting stop relay and means for energizing it responsive to said device arriving in a predetermined subsequently-reached position, a locking circuit for said stop relay including contacts closed responsive to the pick-up relay being energized, means controlled by the stop relay for placing said switch in a normal position and for opening the circuit of said pick-up relay, and means controlled by said stop relay when it again falls back, responsive to its circuit being opened when the pick-up relay falls back, for again starting said step-by-step device.

61. In an impulse transmitting system, an impulse transmitter including a counting device operable in successive stages under the control of an impulse sending device, an outgoing impulse circuit normally out from under the control of said impulse sending device, a pick-up relay and a circuit for energizing it responsive to said counting device reaching a predetermined stage, means including said pick-up relay when energized for placing said outgoing impulse circuit under the control of said impulse sending device, an impulse stop relay and a circuit for energizing it responsive to the arrival of said counting switch in the second predetermined position, means including said stop relay when energized for removing said impulse circuit from under the control of said impulse sending device, a locking circuit for said impulse stop relay controlled by the pick-up relay, means responsive to the energization of said stop relay for returning said counting device to its initial stage and for opening the circuit of said pick-up relay and means controlled by the stop relay, when it falls back responsive to the deactuation of said pick-up relay, for again starting the operation of the counting device under the control of the impulsing device.

62. In an impulse sender for sending a plurality of series of impulses, a pick-up relay and means for operating it to start each series of impulses, a stop relay and means for operating it to stop each series of impulses, and a locking circuit for said stop relay closed responsive to both of said relays being operated.

63. In an impulse sender for sending a plurality of series of impulses, a pick-up relay and means for operating it to start each series of impulses, a stop relay and means for operating it to stop each series of impulses, a locking circuit for said stop relay closed responsive to both of said relays being operated, and means for restoring said pick-up relay responsive to the energization of the stop relay.

64. In a telephone system, A and B operator's positions, trunk lines coming from the A operator's position and passing through the B operator's position to automatic switches, other automatic switches, means for manually connecting a calling line with one of said trunk lines at the A operator's position, an operator's sender at the B position comprising a sending switch and a plurality of storage devices, means whereby the B operator can register the digits in the number of the called line on said devices, automatic means responsive to the manual connection of the said calling line with the selected trunk line and to an operation on the part of the B operator for connecting the sender with the said trunk line, means whereby the sending switch is then controlled by said storage devices successively to transmit series of impulses over the trunk conductors to operate a series of said switches to connect with the called line, and means for automatically disconnecting the sender when the connection is completed.

65. In a telephone system, A and B operator's positions, trunk lines coming from the A operator's position and passing through the B operator's position to automatic switches, other automatic switches, a call circuit extending between said positions whereby the A operator can transmit a desired called number to the B operator, an operator's sender at the B position comprising a sending switch and a plurality of storage devices, means whereby the B operator can register the digits in the called number on said devices, manual means at the A operator's position for connecting a calling line with a particular one of said trunk lines assigned by the B operator over said call circuit, automatic means responsive to the seizing of said trunk line and to an operation of the B operator for connecting said sender with the trunk line assigned, and means for then automatically operating said sending switch under the control of said storage devices to transmit a plurality of series of impulses over the trunk conductors to operate a series of said switches to complete the connection to the called line.

66. In a telephone system, A and B operator's positions, trunk lines extending from the A operator's position through the B operator's position to automatic switches, other automatic switches, means for manually connecting a calling line with one of said trunk lines at said A operator's position, an operator's sender at the B position comprising a sending switch and a plurality of storage devices, means whereby the B operator can register the digits in the number of the called line on said devices, a relay for connecting the sender with the trunk in use, a second relay, a circuit for said first relay controlled by said second relay, means for energizing said second relay when said calling line is connected to said trunk line whereby the sender is connected to the trunk also, and means then automatically responsive whereby the sending switch is controlled by said storage devices to successively transmit series of impulses over the trunk conductors to operate a series of said switches to connect with a called line.

67. In a counting relay arrangement in which the relays are operated in successive stages, a plurality of relays representing each stage, means for selectively controlling the relays of the first stage, and means common to the relays of the first stage and controlled through the contacts of any one of them for transferring the control to the next stage.

68. In a storage device, a plurality of control conductors extending to a plurality of storage relays and corresponding respectively thereto, a transfer relay, and means responsive to an impulse over any one of said conductors for actuating the corresponding storage relay and for actuating the said transfer relay when the impulse subsides.

69. In a storage device, a plurality of control conductors extending to a plurality of storage relays and corresponding respectively thereto, a transfer relay, and means responsive to current flow over any one of said control conductors for actuating the corresponding storage relay and for preparing an operating circuit for said transfer relay.

70. In a storage device, a plurality of control conductors extending to a plurality of storage relays and corresponding respectively thereto, a transfer relay, and means responsive to current flow over any one of said control conductors for actuating the corresponding storage relay and for preparing to operate said transfer relay.

71. In an impulse sending device, an outgoing circuit over which the impulses are to be sent, a counting device, means for sending operating impulses to said counting device, means for sending impulses over said outgoing circuit, said last means being normally ineffective, and means controlled by said counting device responsive to a predetermined number of operating impulses for rendering effective said means for transmitting impulses over said outgoing circuit, and means including a variably adjustable storage device for rendering said last-named means ineffective again upon the transmission of the number of impulses corresponding to the adjustment of said storage device.

72. In a sending device for sending variable numbers of impulses over an outgoing circuit, a counting device, means for sending operating impulses to said counting device and for sending impulses over said outgoing circuit, means normally effective for preventing impulses from going over said outgoing circuit, means responsive to said counting device arriving in a fixed predetermined position for rendering the last named means ineffective, and means including a device adjustable for different numbers of impulses for stopping the transmission of impulses over said outgoing circuit and restoring said counting device to normal upon the transmission over said circuit of the number of impulses for which said device is adjusted.

73. In an impulse sender arranged to send a counted series of impulses over an outgoing circuit, an impulse counting device, means for sending operating impulses to said counting device and for transmitting impulses to said outgoing circuit, and means associated with said counting device for preventing only the first impulse to which the counting device responds from passing over said outgoing circuit and for permitting all other impulses to which said device responds to pass over said outgoing circuit.

74. In a register sender, a set of control conductors, a plurality of digit registers each comprising a group of relays, means for setting said registers successively over said control conductors to store a plurality of digits, an outgoing impulse circuit, an impulse sending device, and means for operating said sending device to send a plurality of trains of impulses over said outgoing circuit of respective digit values corresponding to the setting of the relays of said digit registers.

75. In a register sender, an outgoing conductor, a set of digit keys, storage devices successively set by said key set to store digits, and a single sending device operable to send impulses over said outgoing conductor corresponding to all the stored digits.

76. In a register sender, an outgoing conductor, a set of digit keys, storage devices successively operable under the control of said key set to store digits, sending apparatus operable to send digits over said outgoing conductor, and means including electrical connections between said storage devices and said sending apparatus for causing the digits sent out by said sender to correspond, respectively, in value to the digits stored on said storage devices.

77. In a register sender, a plurality of digit registers, an actuating device, means for operating said actuating device successively in accordance with digits, and for registering such digits on said registering devices responsive to the said operations of said actuating device, an outgoing conductor, a sending device controlled by said registering devices, successively to send impulses over said outgoing conductor, and digit conductors connecting each of said registering devices with said sending device, the said control of the sending device being exercised over said digit conductors.

78. In combination, a set of control conductors, a plurality of digit-storage devices successively operable over said control conductors to store digits, digit conductors outgoing from each of said storage devices, an outgoing impulse circuit, and means for sending digit impulses over said outgoing circuit under the control of said sets of digit conductors successively.

In witness whereof, I hereunto subscribe my name this 9th day of January, A. D. 1930.

MARTIN L. NELSON.